United States Patent [19]

Heckles

[11] 4,170,584

[45] Oct. 9, 1979

[54] SMOKE-SUPPRESSANT COMPOSITION

[75] Inventor: John S. Heckles, Lancaster, Pa.

[73] Assignee: Armstrong Cork Company, Lancaster, Pa.

[21] Appl. No.: 909,621

[22] Filed: May 26, 1978

Related U.S. Application Data

[63] Continuation-in-part of Ser. No. 766,953, Feb. 9, 1977, abandoned.

[51] Int. Cl.$^2$ .......................... C08J 3/18; C08K 5/05; C08K 5/15

[52] U.S. Cl. ...................... 260/30.4 R; 260/45.75 W; 260/45.8 A

[58] Field of Search .................... 260/30.4 R, 45.8 A, 260/45.75 W

[56] References Cited

U.S. PATENT DOCUMENTS

| | | | |
|---|---|---|---|
| 2,234,615 | 3/1941 | Alexander | 260/30.4 R |
| 2,273,682 | 2/1942 | Wolf | 260/30.4 R |
| 2,504,930 | 4/1950 | Hetzel | 260/30.4 R |
| 2,554,142 | 5/1951 | Grummitt | 260/45.8 A |
| 2,995,581 | 8/1961 | Jones et al. | 260/30.4 R |
| 3,074,972 | 1/1963 | Harvey et al. | 260/30.4 R |
| 3,287,374 | 11/1966 | Dunlop | 260/30.4 R |
| 3,945,974 | 3/1976 | Schwarcz et al. | 260/45.75 B |
| 3,991,011 | 11/1976 | Marciniak et al. | 260/45.8 A |

*Primary Examiner*—Herbert J. Lilling

[57] ABSTRACT

Smoke-suppressant polymer compositions are described comprising a resinous polymer of vinyl chloride and a sufficient amount of a smoke-suppressant amount of a heterocyclic compound of the formula

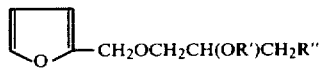

1.

where R' is hydrogen or $C_1$ to $C_8$ linear or branched alkyl carboxylate and where R" is hydrogen, $C_1$ to $C_8$ linear or branched alkoxy, $C_1$ to $C_8$ alkoxy substituted linear or branched $C_1$ to $C_8$ alkoxy, or furfuryloxy;

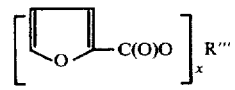

2.

where x is 1 or 2; where x is 1, R''' is $C_1$ to $C_8$ linear or branched alkoxy alkyl or $C_1$ to $C_{10}$ alkoxy alkoxy alkyl; and where x is 2, R''' is $C_1$ to $C_8$ linear or branched alkylene, $C_1$ to $C_{10}$ linear or branched oxyalkylene, or $C_1$ to $C_{10}$ linear or branched polyoxyalkylene; or 3. mixtures thereof.

4 Claims, No Drawings

SMOKE-SUPPRESSANT COMPOSITION

This is a continuation-in-part of U.S. patent application Ser. No. 766,953, filed Feb. 9, 1977, now abandoned.

BACKGROUND OF THE INVENTION

1. Field of the Invention

This invention relates to smoke suppressed polymeric compositions. More particularly, it relates to flame-retardant and low-smoke vinyl resin compositions.

2. Description of the Prior Art

There is a growing concern about the fire safety of a variety of consumer products. As such, a growing recognition that injuries and fatalities arising from fire and flame accidents are not primarily due to burns, but rather to smoke, gases, and oxygen deficiency. Those polymeric compositions containing relatively high percentages of halogen, either chemically attached to the polymer substrate or physically added as plasticizers, are generally considered flame retardant. In this respect, an important flame-retardant, halogen-containing polymer is poly(vinyl chloride). PVC, in its rigid form, is often used in buildings, aircraft, and the like. Rigid vinyl chloride, while being an acceptable flame retardant, has much higher levels of smoke production than considered desirable. In its plasticized form, as in fabrics, upholstery, and surface coverings, additional flammability and smoke generating problems are created whose alleviation has to date been subject to enormous research and development effort. In this respect, a myriad of inorganic materials have been found to function as flame retardants in poly(vinyl chloride)-based compositions. Antimony oxide-containing vinyl compositions have always been regarded as generally flame retardant, although not necessarily smoke retardant. Other metal oxides have served to diminish the disadvantages of antimony oxide in this respect; however, oxides such as calcium oxide and zinc oxide have been noted as detrimental when used in urethane systems so as to partially replace antimony oxide. In U.S. Pat. No. 3,957,723, Lawson et al, it has been disclosed that poly(vinyl chloride) systems containing zinc oxide with aluminum oxide trihydrate are of reduced flammability and diminished smoke intensity. Other PVC-based compositions have been noted to be fire and some retardant by the addition of zinc tungstate (see U.S. Pat. No. 3,901,850). Generally, it has been recognized that the incorporation of various mineral flame retardants in a polymer composition results in the diminished flammability of the polymers. But, concurrently, the emission of increased quantities of smoke occurs as a result of the increased tendency of the polymer to smolder. It has, therefore, been desirable to have additives, in addition to the flame retardant mineral ones, that are active in suppressing smoldering polymers. As a variety of mineral/organic flame retardant/smoke retardant compositions have been found to achieve this result. For example, Elcik, in U.S. Pat. No. 3,983,290, has disclosed that zinc borate is useful in PVC compositions containing a phosphate ester plasticizer. Metal/organic complexes, such as ferrocenes, have also found to be similarly effective in this regard. It has been subsequently established that smoke retardant additives for vinyl chloride polymers should adhere to a number of conditions to make them practically usable. The smoke-retardant additive should be effective within the range of combustion temperatures of the poly(vinyl chloride) polymer composition so as to inhibit smoldering. Further, smoke-retardant additives should be sufficiently compatible with all constituents of the polymeric composition, that is, resinous polymers, stabilizers, plasticizers, and the like, both primary and secondary, antioxidants, flame retardants and others, to remain incorporated under conditions of formulation and use. Additionally, the additives should be sufficiently compatible so they can be mixed and fused into coherent, homogeneous material with good stability and will not separate easily from the final compounded formulation when a stress is imposed upon the system, such as occurs during processing. Chemical stability is a further significant aspect of compatibility of the additive in the formulation, and such should not enhance degradation during processing nor by normal aging.

SUMMARY OF THE INVENTION

It is an object of this invention to provide a new smoke-retardant composition which can be used alone or together with other additives in polyhalocarbon resins to reduce emission of smoke and promote enhanced flame retardancy upon the burning of such compositions.

It is a further object of this invention to provide a smoke-retardant additive for poly(vinyl chloride) compositions which is compatible with the other constituents of the polymeric composition under conditions of formulation and use.

It is another object of the present invention to provide smoke-retardant properties without undue impairment of critical polymer properties in poly(vinyl chloride) resinous compositions.

These and other objects of the present invention have been attained by the incorporation of high oxygen content alkoxy or alkyl-substituted furans into a vinyl chloride polymer composition.

DESCRIPTION OF THE PREFERRED EMBODIMENTS

The flame-and smoke-retardant compositions of the present invention are obtained by incorporating into a halocarbon polymeric composition comprising a vinyl chloride resin and stabilizer a heterocyclic compound of the formula

1.

where R' is hydrogen or $C_1$ to $C_8$ linear or branched alkyl carboxylate, and where R" is hydrogen, $C_1$ to $C_8$ linear or branched alkoxy, $C_1$ to $C_8$ alkoxy substituted linear or branched $C_1$ to $C_8$ alkoxy, or furfuryloxy;

2.

where x is 1 or 2; where x is 1, R''' is $C_1$ to $C_8$ linear or branched alkoxy alkyl or $C_1$ to $C_{10}$ alkoxy alkoxy alkyl; and where x is 2, R''' is $C_1$ to $C_8$ linear or branched alkylene, $C_1$ to $C_{10}$ linear or branched oxyalkylene, or $C_1$ to $C_{10}$ linear or branched polyoxyalkylene, or 3. mixtures thereof.

As a result of incorporating these high-oxygen heterocyclic plasticizers into the halocarbon polymeric materials, a polymer composition is formed that is both flame retardant and substantially reduced in smoke generation in both flaming and nonflaming modes.

The term "high oxygen content" as used herein is based upon the compound di-2-ethylhexylphthalate (DOP), one of the most common and widely used plasticizers in polyhalocarbon systems. This plasticizer has an oxygen content of 16%. The high oxygen content heterocyclic plasticizers of the present invention are those having an oxygen content of greater than that of DOP, e.g., 16%. For example, the heterocyclic plasticizer 3-furfuroxy 2-propanol has an oxygen content of 30.8% and dimethylenefuroate has an oxygen content of 41.2%, both substantially greater than the oxygen content of DOP.

The furan-containing plasticizers are represented by the formula

A procedure particularly of use for the preparation of the above is as follows:

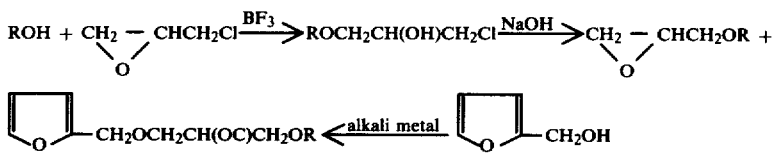

These high oxygen content plasticizers are useful in the low-smoke compositions of the present invention in from about 1 to about 80 parts per 100 parts of polyhalocarbon resin (phr), preferably 5 to 40 phr.

Generally, it has been found that the incorporation of a further additive, an oxide, hydroxide or salt of zinc, further reduces the amount of smoke in the organic carbonate plasticized compositions of this invention. Preferably, the zinc compound is blended into the formula in from about 0.01 to about 20 parts by weight per 100 parts of polyhalocarbon. Most preferably about 1 to about 5 phr by weight of zinc oxide per 100 parts of polyhalocarbon resin is incorporated in these formulations.

Halocarbon polymers used in this invention include homopolymers, copolymers and blends of homopolymers and/or copolymers, such as illustrated by various poly(vinyl chloride) resins. These copolymers may contain from 0 up to about 50% by weight of at least one other olefinically unsaturated monomer, more preferably at least one other vinylidene monomer (i.e., monomer containing at least one terminal $CH_2=C<$ group per molecule) copolymerized therewith, more preferably up to about 20% by weight of such monomer. Suitable monomers include 1-olefin containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ-cyanopropyl acrylates and the like; olefinically unsaturated carboxylic acids and esters thereof; including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically unsaturated carboxylic acids such as acrylamide and the like; divinyls, diacrylates and other polyfunction monomers such as divinyl benzene, divinyl ether, diethylene glycol diacrylate, ethylene glycol dimethacrylate, methylene-bis-acrylamide, allyl pentaerythritol, and the like; bis-(β-haloalkyl)alkenyl phosphonates such as bis(β-chloroethyl) vinyl phosphonate and the like.

The halocarbon polymers may be prepared by any method known to the art such as by emulsion, suspension, bulk or solution polymerization. The additive compounds may be mixed with the polymer emulsion, suspension, solution or bulk mass before monomer recovery and/or drying. More preferably, the compounds may be mixed with dry granular or powdered polymers. The polymer and compound may be mixed thoroughly in granular or powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound, but will generally be in the range of about 300° to 400° F. and 2 to 10 minutes.

Most of the commercially available PVC plasticizers can be successfully incorporated into these compositions. The common types include monomeric or polymeric esters of adipic, azelaic, oleic, phosphoric, sebacic, stearic, phthalic or trimellitic acid and of allyl alcohol, glycerol, butanol, isobutanol, pentanol(s), (methyl) cyclohexanol(s), 2-ethylhexanol, octanol(s), benzyl alcohol, tetrahydrofurfuryl alcohol, propylene glycol, diethylene glycol, dipropylene glycol, triethylene glycol, tripropylene glycol, polyethylene glycol(s) or polypropylene glycols. The choice of type, of course, will be dictated by the desired level of properties and performance of the end product.

Suitable stabilizers for use in the present composition include those conventionally used for stabilizing the polymers employed, e.g., barium-cadmium stearate, laurate or oleate (7 to 15% metal content), (e.g., Ferro 75-001, trademark); barium-zinc octoate (e.g., Synpron 744, trademark Synthetic Products Company); liquid epoxy resin (e.g., bis[3,4-epoxy-6-methylcyclohexylmethyl] adipate, Ciba CY 178, trademark); phosphate chelator (e.g., tri[nonylated phenyl] phosphite, Mark C. trademark); ultraviolet absorber (e.g., 2-[2'-hydroxyphenyl-5-ethyl]benzotriazole, Tinuvin 328, trademark), antioxidant (e.g., tetrakis [methylene 3-(3',5'-di-t-butyl-4'hydroxyphenyl) propionate] methane, Irganox 1010, trademark).

The vinyl chloride and vinylidene chloride polymer compositions of this invention may contain the usual compounding ingredients known to the art such as fillers, opacifiers, lubricants, processing aids, impact modifying resins, antioxidants, and the like.

The term flaming and nonflaming modes is derived from using the NBS Smoke Density Chamber Test. This test is described in great detail in the article by D. Gross, J. J. Loftus, and A. F. Robertson, ASTM Special Technical Publication 422, pages 166-204 (1969). In this test, the maximum specific optical density, $D_m$, corrected for soot deposits on smoke density chamber cell windows is obtained. The examples illustrated herein disclose the average smoke value per gram, SV/g or $D_m(corr)/g$ of each sample tested for both flaming (f) and nonflaming (s) modes. The use of $D_m(corr)$ or SV/g allows for the correction of the smoke density value for sample weight and, therefore, is valid for samples which are quite thin but have about the same weight. A maximum average $D_m(corr)$ value of 450, as determined in the NBS Smoke Density Chamber, has been adopted as a regulation value for interior finishes, including floorings and the like, by the U.S. Department of Health, Education and Welfare.

In the examples that follow, smoke generated by the poly(vinyl chloride) resin-containing compositions was measured by the method described above using an instrument designated Model 4-5800, Aminco-NBS Smoke Density Chamber, American Instrument Company.

Test samples were made by blending the smoke suppressant composition with the thermoplastic resins upon weight basis in terms of parts per hundred of resin (PHR) in typical formula well known in the industry.

Additives were blended with the thermoplastic resins by milling at a temperature of about 160° C. to 170° C. for five to ten minutes. The sheets were removed from the mill, allowed to cool, and test samples were then cut from the sheet. Sheets obtained in this manner were approximately 14 inches wide by about 0.020 inchdes in thickness. Test samples for smoke determinations were cut from the sheets produced in this manner.

In accordance with the test procedure mentioned above, each sample was exposed to an energy flux of 2.5 w/cm² from a radiant heater under flaming conditions. Flames from a multi-directional propane burner impinged upon the sample and then into the trough at the bottom of the sample altered during these measurements.

The sample was exposed until a minimum transmittance value was obtained. After the smoke had been flushed from the cabinet, the residual attenuation of the light beam, caused by deposits on the windows in the test chamber, was recorded and a correction applied to the maximum absorbence value.

Specific optical densities were then normalized with respect to unit surface area of the sample $(D_m)$. The specific optical densities are defined by the following expression: $D_m(corr) = V/A'L \times A$ max. (corr) where V equals test chamber volume; L equals optical path length; A' equals surface area of the sample; A max. (corr) equals A max. minus $A_w$, A max. (corr) minus maximum corrected absorbence during the test, A max. minus maximum measured absorbence during the test, $A_w$ minus absorbence caused by deposits on the window. In order to set forth a clear understanding of this invention, the following illustrative examples are provided.

EXAMPLE 1

3-Furfuroxy 2-Propanol

Sodium 1.9 g was added to 189 g (1.9 m) furfuryl alcohol and 93 g (1.6 m) propylene oxide added over 1 hour increasing temperature from 80° to 130°. Reaction product was distilled without work-up to recover 251 g product, 57°-63° 1 mm, 88% yield.

EXAMPLE 2

Glycerol 1,3-Ethylfurfuryl Diether

Sodium 1.35 g was added to 139 g (1.42 m) furfuryl alcohol and 138 g (1.35 m) ethyl glycidyl ether added over 50 minutes at 105°-115°, held at 100° for 2 hours and distilled without work-up. Product recovered in fraction 2, 91°-95° 1 mm. Yield 253 g, 93%.

EXAMPLE 3

Glycerol 1,3-Butoxyethyl-Furfuryl Diether (a) Butoxy ethyl ether chlorohydrin.

Epichlorohydrin 279 g (3 m) added to 354 g (3 m) butyl cellosolve and 1.8 g BF₃ etherate at 50°-60° over 2¼ hours. Reaction contained 68% chlorohydrin, 11% butyl cellosolve and 15% by-product. Chlorohydrin collected in fraction 3, 134°-144° 8 mm, 89% product by gc and in fraction 4, 110°-116° 1 mm, 93% product by gc. Yield 406 g, 64%.

(b) Butoxyethyl glycidyl ether.

Aqueous 50% NaOH added to butoxyethyl ether chlorohydrin (4917-1 fr. 1 and 2). Product collected in fraction 1, 59°-62° 1 mm, 93% product by gc and in fraction 2, 62°-67° 1 mm, 90% product by gc.

(c) Glycerol 1,3-butoxyethyl-furfuryl diether.

Butoxyethyl glycidyl ether 112 g (0.64 m) added to 76 g (0.77 m) furfuryl alcohol and 0.7 g sodium at 80° and held 5 hours 82°. Reaction 71% diether product and 5% unreacted glycidyl ether. Product collected in fraction 2, 105°-123° 1 mm, 99% product by gc. Yield 116 g, 62%.

EXAMPLE 4

Glycerol 1,3-Propylfurfuryl Diether

In the same manner as Example 3, but using n-propanol instead of butyl cellosolve glycerol, 1,3-propylfurfuryl diether was synthesized. Yield (a) 1-propyl ether chlorohydrin, 48°-50° C. 1 mm/Hg 98%; Yield (b) propyl glycidyl ether, 53°-57° C., 14 mm/Hg 48%, Yield (c) glycerol 1,3-propylfurfuryl diether 94°-101° C., 1 mm/Hg 70%.

EXAMPLE 5

Glycerol 1,3-Ethoxyethyl-Furfuryl Diether

In the same manner as Example 3, but using 2-ethoxy ethanol instead of butyl cellosolve, glycerol 1,3-ethoxyethyl furfuryl diether was synthesized. Yield (a) 2-ethoxyethyl ether chlorohydrin b.p. 129°–140° C., 20 mm/Hg, 56%; Yield (b) 2-ethoxyethyl glycidyl ether b.p. 82°–100° C., 8 mm/Hg, 74%; Yield (c) glycol 1,3-ethoxyethyl furfuryl diether b.p. 121°–130° C., 1 mm/Hg 70%.

EXAMPLE 6

Glycerol 1,3-Butylfurfuryl Diether

In the same manner as Example 3, but using n-butanol instead of butyl cellosolve, glycerol 1,3-butylfurfuryl diether was synthesized. Yield (a) 1-butylether chlorohydrin, b.p. 64°–67° C., 1 mm/Hg 66%; Yield (b) butyl glycedyl ether, b.p. 58°–66° C., 9 mm/Hg 57%; Yield (c) glycerol 1,3-butylfurfuryl diether 105°–110° C., 1 mm/Hg 75%.

EXAMPLE 7

Glycerol 1,3-Difurfuryl Diether

Epichlorohydrin 93 g (1 m) added to 245 g (2.5 m) furfuryl alcohol and 25 g (1.1 m) sodium in 45 minutes at 122°–125° and held 6 hours 120°. Washed with water and distilled. Difurfuryl ether product collected in fraction 2, 148°–154° 1 mm. Yield 156 g, 62%.

EXAMPLE 8

Glycerol 1,3-Propylfurfuryl Diether 2-Acetate

Glycerol 1,3-propylfurfuryl diether (Example 4) 86 g (0.4 m), 61 g (0.6 m) acetic anhydride and 16 g pyridine reacted 3 hours at 62°. Hexane solution of reaction washed with dil. HCl, sat. NaHCO$_3$, dried with MgSO$_4$ and distilled. Acetate collected in fraction 2, 128°–129° 1 mm. Yield 93 g, 88%.

EXAMPLE 9

Glycerol 1,3-Butylfurfuryl Diether 2-Acetate

Glycerol 1,3-butylfurfuryl diether (Example 6) 68 g (0.3 m), 46 g (0.45 m) acetic anhydride and 12 g pyridine reacted in stoppered flask at room temperature (R.T.). Acetate product was collected in fraction 1, 133°–136° 1 mm.

EXAMPLE 10

Glycerol 1,3-Ethoxyethyl-Furfuryl Diether 2-Acetate

Glycerol 1,3-ethoxyethyl-furfuryl diether (Example 5) 73 g (0.3 m), 46 g (0.45 m) acetic anhydride and 12 g pyridine were reacted at R.T. overnight. Acetate product was collected in fraction 3, 150°–151° 1 mm. Yield 62 g, 70%.

EXAMPLE 11

Glycerol 1,3-Butoxyethyl-Furfuryl Diether 2-Acetate

Glycerol 1,3-butoxyethyl-furfuryl diether (Example 3) 54 g (0.2 m), 31 g (0.3 m) acetic anhydride and 9 g pyridine reacted at R.T. overnight. Acetate product collected in fraction 2, 160°–164° 1 mm.

EXAMPLE 12

Ethylene Glycol Difuroate

Furoyl chloride 66 g (0.51 m) added to 14 g (0.23 m) ethylene glycol, 70 g (0.69 m) EtN$_3$ and 230 g methylene chloride at 0°–5° C. Warmed to R.T. and EtN$_3$.HCl removed by filtration. CH$_2$Cl$_2$ solution washed with dil. HCl, 2X with water, dried with MgSO$_4$ and CH$_2$Cl$_2$ evaporated. Yield 34 g crystallized from isopropyl alcohol (110°–111° m.p.).

EXAMPLE 13

Diethylene Glycol Difuroate

Furoyl chloride 58 g (0.44 m) added to 21 g (0.2 m) diethylene glycol, 61 g (0.6 m) triethylamine in 200 g methylene chloride at 5°–10°. Warmed to R.T. and 54 g Et$_3$N.HCl removed by filtration. 56 g yield of product recrystallized from isopropyl alcohol, 66°–67° m.p.

EXAMPLE 14

Hexanediol Difuroate

Furoyl chloride 121 g (0.93 m) added to 52 g (0.44 m) hexanediol, 133 g (1.3 m) triethylamine and 485 g methylene chloride at 5°–10°. Yield of 92 g recrystallized from isopropyl alchol, 69°–71° m.p.

EXAMPLE 15

Dipropylene Glycol Difuroate

Furoyl chloride 29 g (0.22 m) added to 13.4 g (0.1 m) dipropylene glycol, 25 g (0.1 m) triethylamine and 200 g methylene chloride at −5°. Heated to 45°, cooled, filtered 32 g Et$_3$N.HCl (calc. 33 g). Crude undistilled yield 31.6 g.

EXAMPLE 16

Tetraethyleneglycol Difuorate

Furoyl chloride 29 g (0.22 m) added to 19 g (0.1 m) tetraethyleneglycol, 55 g (0.3 m) triethylamine and 270 g methylene chloride at 5°. Et$_3$N.HCl 27 g removed by filtration. Crude undistilled yield 40.9 g.

EXAMPLE 17

Triethyleneglycol Difuroate

Furoyl chloride 52 g (0.22 m) added to 27 g (0.1 m) triethylene glycol, 55 g (0.3 m) triethylamine and 270 g methylene chloride at 0°–5°. Recrystallized yield of 47 g from ethanol, 62°–63° m.p.

EXAMPLE 18

Triethyleneglycol Difuroate

Triethylene glycol 66 g (0.44 m), 99 g (0.88 m) furoic acid and dibutyltin dioctoate catalyst heated 160°–200° with xylene azeotrope to 3.8 acid number. Two crystallizations 20% conc. from isopropyl alcohol 90 g yield 63°–65° m.p.

EXAMPLE 19

Butanediol Difuroate

Furoyl chloride 66 g (0.5 m) added to 20.7 g (0.23 m) 1,4-butanediol in 69.7 g (0.69 m) triethylamine and 230 g methylene chloride at 5°. Recrystallized from isopropyl alcohol to yield 37.2 g, 66.5°–67.4° m.p.

EXAMPLE 20

2-Butoxyethylfuroate

2-Butoxyethanol (butyl cellosolve) 121 g (1.02 m), furoic acid 95 g (0.85 m) and 1 g dibutyltin dioctoate were heated with a xylene azeotrope to acid number 3. Xylene removed by distillation to a pot temperature of 200° and reaction product distilled. 2-Butoxyethylfuroate collected in fraction 2, 111°-104°. Yield 162 g, 86%.

In order to ascertain compatibility of these plasticizers, the above formulation was blended in a Brabender Plastograph heated at 310° F. and mixed until a steady melt viscosity was reached (5–8 minutes). The resulting mass was pressed in a Wabash press at 300°-320° F. between chrome plates and Teflon cloth to 20–30 mils thickness. Both Brabender viscosity (an indicator of processability), compatibility during mixing and long-term compatibility were evaluated from this technique.

R"CH$_2$CH(OH)CH$_2$OH$_2$C—[furan]

| Example | R" | NBS Smoke Density fl. | s. | avg. | Sample[1] Comment |
|---|---|---|---|---|---|
| 22 | H | 212 | ND[2] | | c, inflex. |
| 23 | C$_2$H$_5$O (ethoxy) | 276 | 118 | 197 | c, inflex. |
| 24 | C$_2$H$_5$O (ethoxy), ZnO (2 phr) | 215 | ND | | |
| 25 | C$_3$H$_7$O (propoxy) | 284 | 110 | 197 | c, flex. |
|  | C$_3$H$_7$O (propoxy) (repeat) | 274 | 105 | 189 | c, flex. |
| 26 | C$_3$H$_7$O (propoxy), ZnO (2 phr) | 212 | ND | | |
| 27 | C$_4$H$_9$O (butoxy) | 327 | 130 | 229 | c, flex. |
|  | C$_4$H$_9$O (butoxy) (repeat) | 309 | 143 | 226 | c, flex. |
| 28 | C$_5$H$_5$O$_2$ (furfuroxy) | 238 | ND | | yellow, inflex. |
| 29 | C$_2$H$_5$O(CH$_2$)$_2$O (2-ethoxy ethoxy) | 337 | 253 | 295 | c, flex. |
| 30 | C$_4$H$_9$O(CH$_2$)$_2$O (2-butoxy ethoxy) | 468 | 288 | 378 | ic, flex. |

[1]c-compatible, ic-incompatable, flex.-flexible
[2]Not Determined

EXAMPLE 21

2-(2-Ethoxyethoxy)Ethyl Furoate 2-(2-Ethoxyethoxy) ethanol, carbitol solvent, 129 g (0.96 m), 90 g (0.8 m) furoic acid and 1 g dibutyltin dioctoate were heated with xylene to remove water by azeotropic distillation to acid number 1.4. Zylene removed by distillation at a pot temperature of 200° and product distilled. Carbitol furoate was collected in fraction 2, 121°-125°, 91% carbitol furoate by gc. Yield of carbitol furoate 144 g, 79%.

The furane-containing plasticizers of use as smoke-suppressant additives in accordance with the present invention were blended in the following standard poly(vinyl chloride) resin-containing formulation. Additives are in parts per 100 parts of poly(vinyl chloride) resin by weight.

| Masterswitch | |
|---|---|
| Poly(vinyl chloride) copolymer, Escambia 2160, Escambia Chemical Co. Specific viscosity by ASTM-D-1243-60-B 0.02 | 100 |
| Synpron 744, zinc octoate/barium phenate/aryl-phosphite, Synthetic Chemical Corp. | 4.0 |
| Admex 710 (epoxidized soybean oil) | 1.0 |
| Furane-containing plasticizer | 36 |

R"OCH$_2$CH[OC(O)CH$_3$]CH$_2$OH$_2$C—[furan]

| Example | R" | NBS Smoke Density fl. | s. | avg. |
|---|---|---|---|---|
| 31 | propyl | 289 | 107 | 198 |
| 32 | butyl | 278 | 165 | 222 |
| 33 | 2-ethoxy-ethyl | 285 | 175 | 230 |
| 34 | 2-butoxy-ethyl | 280 | 192 | 236 |

[furan]—C(O)O—R'''$_x$

| Example[1] | R''' | Brabender Viscosity meter/g | NBS Smoke Density fl. |
|---|---|---|---|
| 35 | (CH$_2$)$_2$ | 575 | 374 |
| 36 | C$_2$H$_4$OC$_2$H$_4$ | 575 | 315 |
| 37 | C$_2$H$_4$OC$_2$H$_4$ 2 phr, ZnO | 800 | 218 |
| 38 | (CH$_2$)$_6$ | 525 | 336 |
| 39 | C$_3$H$_6$OC$_3$H$_6$ | 550 | 324 |
| 40 | (CH$_2$)$_4$ | 750 | 305 |

[1]Plasticizers are incorporated herein in 40 phr concentration. x = 2

[furan]—C(O)O—R'''

| Example | R''' | ZnO phr | Brabender Viscosity m/g | NBS Smoke Density fl. | s. | avg. | Sample Compatibility |
|---|---|---|---|---|---|---|---|
| 41 | C$_4$H$_9$O(CH$_2$)$_2$ | 0 | 550 | 321 | 216 | 269 | c |
| 42 | C$_2$H$_5$O(CH$_2$)$_2$O(CH$_2$)$_2$ | 0 | 600 | 343 | 344 | 344 | sl. ic |
| 43 | " | 0.4 | 550 | 187 | 186 | 187 | c |

-continued

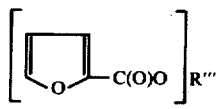

| Example | R''' | ZnO phr | Brabender Viscosity m/g | NBS Smoke Density fl. | s. | avg. | Sample Compatibility |
|---|---|---|---|---|---|---|---|
| 44 | " | 1.2 | 550 | 173 | 216 | 195 | c |
| 45 | " | 2.0 | 400 | 205 | 270 | 238 | c |

What is claimed is:

1. A smoke-retardant composition comprising
    (a) a poly(vinyl chloride) homopolymer or copolymer with up to about 50% by weight of at least one other olefinically unsaturated monomer, and
    (b) a smoke-suppressant amount of a heterocyclic compound of the formula

where R' is hydrogen or $C_1$ to $C_8$ linear or branched alkyl carboxylate, and R" is hydrogen, $C_1$ to $C_8$ linear or branched alkoxy, $C_1$ to $C_8$ alkoxy substituted linear or branched $C_1$ to $C_8$ alkoxy or furyloxy.

2. The smoke-retardant composition of claim 1 wherein said heterocyclic compound is present in a total amount of from about 1 to about 80 parts per 100 parts of said halocarbon polymer.

3. The smoke-retardant composition of claim 1 additionally comprising a smoke suppressant synergistic amount of an oxide, hydroxide or salt of zinc.

4. The smoke-retardant composition of claim 3 wherein said oxide, hydroxide or salt of zinc oxide in about 0.01 to about 20 parts per 100 parts of said halocarbon polymer.

* * * * *